United States Patent
Kogusuri

(10) Patent No.: US 8,355,172 B2
(45) Date of Patent: Jan. 15, 2013

(54) COLOR PRINTER SYSTEM AND PRINTING METHOD INCLUDING PLURAL DATA TRANSMITTING UNITS CONNECTED TO PLURAL TRANSMISSION PATHS

(75) Inventor: Yuji Kogusuri, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 31 days.

(21) Appl. No.: 12/929,916

(22) Filed: Feb. 24, 2011

(65) Prior Publication Data
US 2011/0211203 A1 Sep. 1, 2011

(30) Foreign Application Priority Data

Mar. 1, 2010 (JP) ................................ 2010-044359
Sep. 30, 2010 (JP) ................................ 2010-221685

(51) Int. Cl.
*H04N 1/60* (2006.01)
(52) U.S. Cl. ......... 358/1.9; 358/1.15; 358/2.1; 358/3.23
(58) Field of Classification Search ........... 358/1.1–3.29
See application file for complete search history.

(56) References Cited

U.S. PATENT DOCUMENTS
2006/0007472 A1* 1/2006 Takebe ........................ 358/1.15

FOREIGN PATENT DOCUMENTS

| JP | 3263212 B2 | 12/2001 |
|----|----|----|
| JP | 2002120412 A | 4/2002 |
| JP | 2004258512 A | 9/2004 |
| JP | 2005001340 A | 1/2005 |
| JP | 2006279582 A | 10/2006 |
| JP | 2008062465 A | 3/2008 |
| JP | 2008079247 A | 4/2008 |
| JP | 2008207492 A | 9/2008 |

* cited by examiner

*Primary Examiner* — Benny Q Tieu
*Assistant Examiner* — Marcellus Augustin
(74) *Attorney, Agent, or Firm* — Harness, Dickey & Pierce, P.L.C.

(57) ABSTRACT

A color printer system includes plural data transmitting units that transmits image data of each color to an engine, and a printing control unit that controls the plural data transmitting units. The printing control unit and an image data generating apparatus are connected by a first transmission path, and the plural data transmitting units and the image data generating apparatus are connected by plural of second transmission paths allocated to each color. The image data generating apparatus includes: an image data generating unit that performs bitmap expansion on a print job for each color to generate image data; and a communication unit that sequentially allocates the image data of colors other than a color not used for the superimposed printing to the second transmission path, which is allocated to transmit the image data of the not used color, and transmits the image data in units of transmission.

16 Claims, 18 Drawing Sheets

FIG. 3

| TRANS-MISSION PATH | TRANS-MISSION PATH (Y) | TRANS-MISSION PATH (M) | TRANS-MISSION PATH (C) | TRANS-MISSION PATH (K) | TRANSMISSION PATH (SPECIAL COLOR) |
|---|---|---|---|---|---|
| FIRST ROUND | 1-Y | 1-M | 1-C | 1-K | UNUSED |
| SECOND ROUND | 2-Y | 2-M | 2-C | 2-K | UNUSED |
| THIRD ROUND | 3-Y | 3-M | 3-C | 3-K | UNUSED |
| FOURTH ROUND | 4-Y | 4-M | 4-C | 4-K | UNUSED |
| FIFTH ROUND | 5-Y | 5-M | 5-C | 5-K | UNUSED |
| SIXTH ROUND | 6-Y | 6-M | 6-C | 6-K | UNUSED |
| SEVENTH ROUND | 7-Y | 7-M | 7-C | 7-K | UNUSED |
| EIGHTH ROUND | 8-Y | 8-M | 8-C | 8-K | UNUSED |
| NINTH ROUND | 9-Y | 9-M | 9-C | 9-K | UNUSED |
| TENTH ROUND | 10-Y | 10-M | 10-C | 10-K | UNUSED |

FIG. 4

| TRANS-MISSION PATH | TRANS-MISSION PATH (Y) | TRANS-MISSION PATH (M) | TRANS-MISSION PATH (C) | TRANS-MISSION PATH (K) | TRANSMISSION PATH (SPECIAL COLOR) |
|---|---|---|---|---|---|
| FIRST ROUND | 1-Y | 1-M | 1-C | 1-K | 2-Y |
| SECOND ROUND | 3-Y | 2-M | 2-C | 2-K | 3-M |
| THIRD ROUND | 4-Y | 4-M | 3-C | 3-K | 4-C |
| FOURTH ROUND | 5-Y | 5-M | 5-C | 4-K | 5-K |
| FIFTH ROUND | 6-Y | 6-M | 6-C | 6-K | 7-Y |
| SIXTH ROUND | 8-Y | 7-M | 7-C | 7-K | 8-M |
| SEVENTH ROUND | 9-Y | 9-M | 8-C | 8-K | 9-C |
| EIGHTH ROUND | 10-Y | 10-M | 10-C | 9-K | 10-K |

FIG. 5

| TRANS-MISSION PATH | TRANS-MISSION PATH (Y) | TRANS-MISSION PATH (M) | TRANS-MISSION PATH (C) | TRANS-MISSION PATH (K) | TRANSMISSION PATH (SPECIAL COLOR) |
|---|---|---|---|---|---|
| FIRST ROUND | 2-Y | 2-M | 2-C | 2-K | 4-Y |
| SECOND ROUND | 1-Y | 4-M | 4-C | 4-K | 1-M |
| THIRD ROUND | 6-Y | 6-M | 1-C | 1-K | 6-C |
| FOURTH ROUND | 3-Y | 3-M | 3-C | 6-K | 3-K |
| FIFTH ROUND | 6-Y | 6-M | 6-C | 6-K | 7-Y |
| SIXTH ROUND | 8-Y | 7-M | 7-C | 7-K | 8-M |
| SEVENTH ROUND | 9-Y | 9-M | 8-C | 8-K | 9-C |
| EIGHTH ROUND | 10-Y | 10-M | 10-C | 9-K | 10-K |

FIG. 8

| TRANS-MISSION PATH | TRANS-MISSION PATH (Y) | TRANS-MISSION PATH (M) | TRANS-MISSION PATH (C) | TRANS-MISSION PATH (K) | TRANSMISSION PATH (SPECIAL COLOR) |
|---|---|---|---|---|---|
| FIRST ROUND | 1-Y | 1-M | 1-C | 1-K | 3-Y |
| SECOND ROUND | 5-Y | 3-M | 3-C | 3-K | 5-M |
| THIRD ROUND | 7-Y | 7-M | 5-C | 5-K | 7-C |
| FOURTH ROUND | 9-Y | 9-M | 9-C | 7-K | 9-K |
| FIFTH ROUND | 11-Y | 11-M | 11-C | 11-K | 13-Y |
| SIXTH ROUND | 15-Y | 13-M | 13-C | 13-K | 15-M |
| SEVENTH ROUND | 17-Y | 17-M | 15-C | 15-K | 17-C |
| EIGHTH ROUND | 19-Y | 19-M | 19-C | 17-K | 19-K |

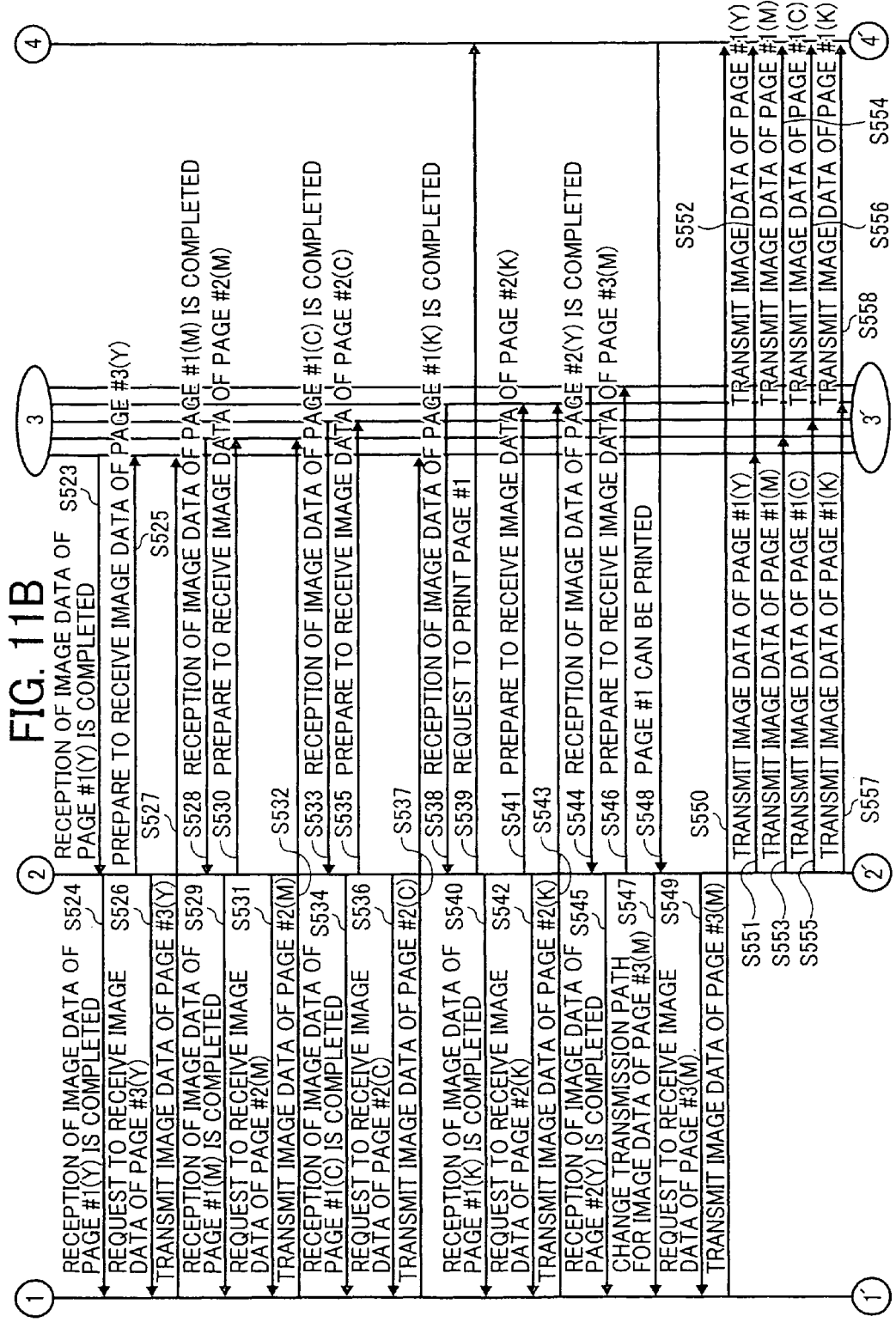

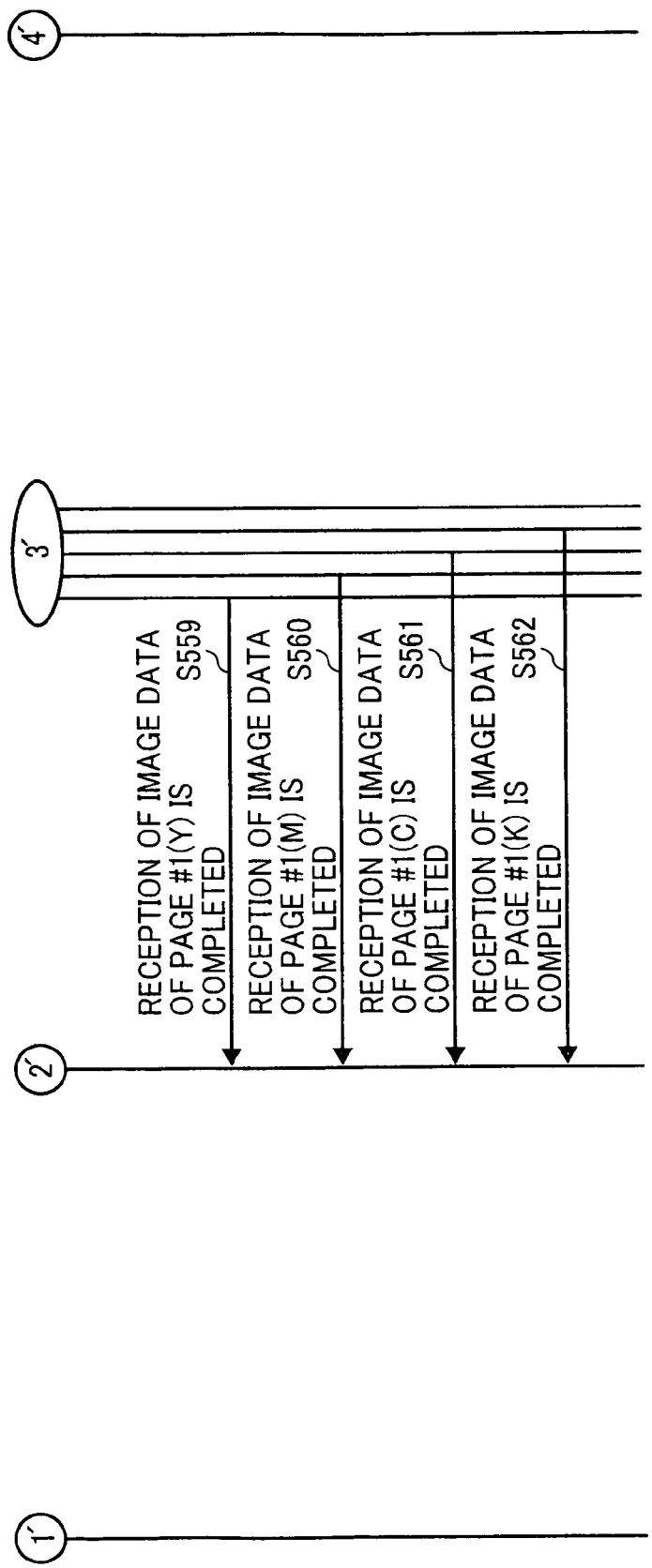

FIG. 15

| LEFT SIDE | RIGHT SIDE |
|---|---|
| PAGE #19 | PAGE #10 |
| PAGE #17 | PAGE #8 |
| PAGE #15 | PAGE #6 |
| PAGE #13 | PAGE #4 |
| PAGE #11 | PAGE #2 |

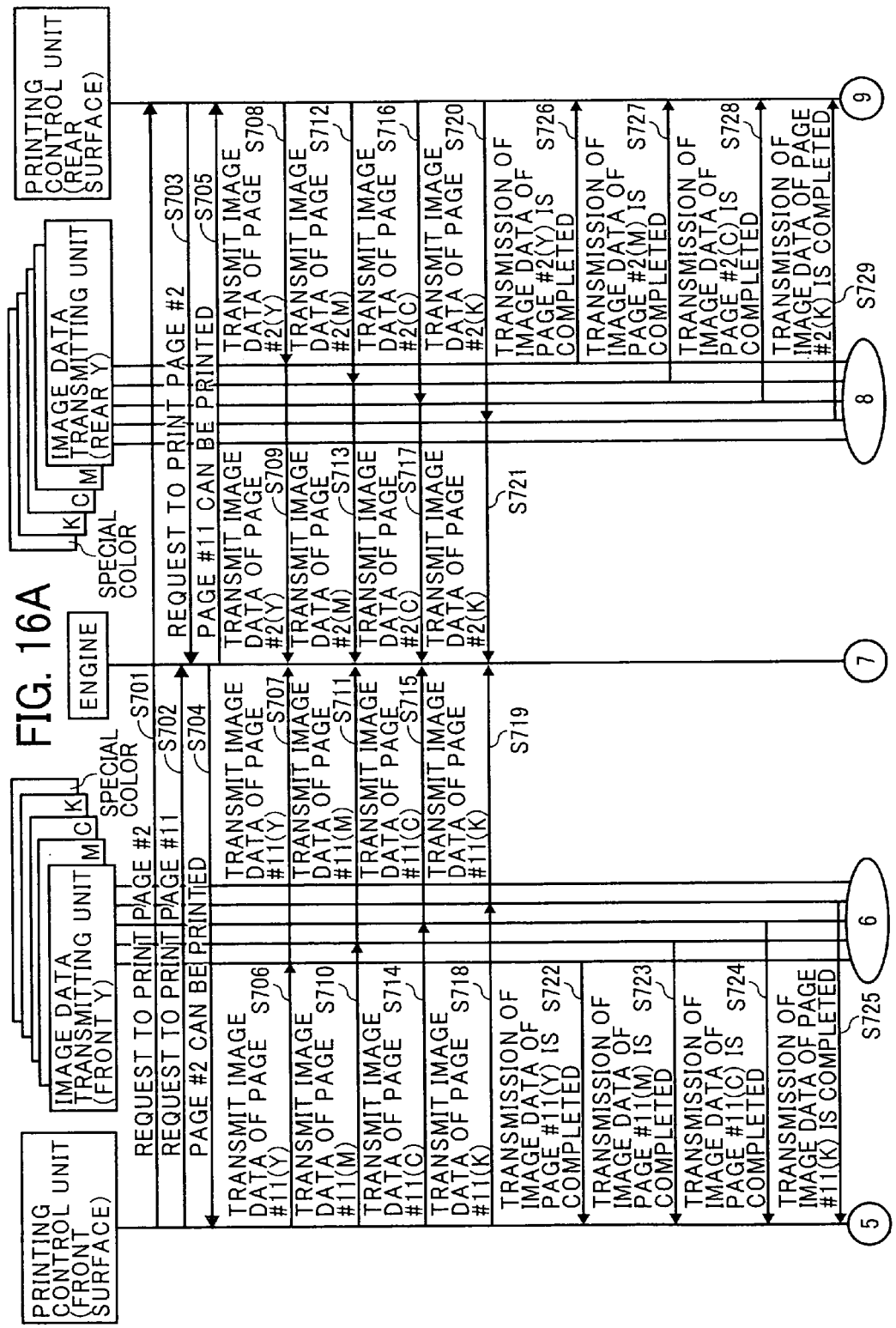

COLOR PRINTER SYSTEM AND PRINTING METHOD INCLUDING PLURAL DATA TRANSMITTING UNITS CONNECTED TO PLURAL TRANSMISSION PATHS

CROSS-REFERENCE TO RELATED APPLICATIONS

The present application claims priority to and incorporates by reference the entire contents of Japanese Patent Application No. 2010-044359 filed in Japan on Mar. 1, 2010 and Japanese Patent Application No. 2010-221685 filed in Japan on Sep. 30, 2010.

BACKGROUND OF THE INVENTION

1. Field of the Invention

The present invention relates to a color printer system and a printing method.

2. Description of the Related Art

Printers for a field of production printing (PP) that are used to achieve high-capacity and high-speed printing need to constantly perform printing at a high print speed and high resolution. Therefore, a challenge of the development of such printers is to transmit image data at a high speed. For example, a printer system for the PP field includes a raster image processing (RIP) server, an engine controller, and an engine.

An engine has been known which includes data transmission paths corresponding to five colors in five stations (Y (yellow), M (magenta), C (cyan), K (black), and a special color) (for example, see Japanese Patent Application Laid-open No. 2004-258512). A general color image is formed by using data of four colors, such as Y, M, C, and K, and a special color is not used to form a general color image. For example, the special color is a gold color, or clear toner, but is not limited thereto. The special color may be colors other than Y, M, C, and K.

In recent years, a technique has been examined which transmits uncompressed image data between the RIP server and the engine controller to increase a speed of the printer system.

In this case, a technique has been known in which image data are transmitted through high-speed transmission paths and the transmission paths for transmitting the image data are provided for respective colors, thereby transmitting the image data at a high speed (for example, see Japanese Patent Application Laid-open No. 2005-001340).

That is, Japanese Patent Application Laid-open No. 2005-001340 discloses a control method which fixedly allocates transmission paths for colors that are not used for printing to transmission paths for colors that are used for printing, in the printing mode in which the transmission paths for only one or two colors are used among the transmission paths for four (Y, M, C, and K) colors, in order to improve the transmission efficiency of image data (shorten the transmission time or improve image quality at the same transmission time). All of the transmission paths for Y, M, and C are allocated to K when printing is performed with only one color, that is, K, for example. When printing is performed with two colors, that is, Y and M, the transmission path for C is allocated to Y and the transmission path for K is allocated to M.

As another related art, an image transmitting method has been proposed which divides image data of a predetermined color among the image data of a plurality of colors into pixel units, periodically allocates a plural pieces of image data of the predetermined color, or the pixel units, which correspond to continuous pixels, to a transmission path for the image data of the predetermined color and the transmission paths for the image data of colors other than the predetermined color, and transmits the image data (for example, see Japanese Patent Application Laid-open No. 2006-279582).

However, in the related art, the transmission paths are allocated to all colors and image data is allocated to each transmission path and is then transmitted. Therefore, for example, even when printing is performed with four colors, that is, Y, M, C, and K, without using the special color, the time required to transmit the image data is the same as that when printing is performed with all of five colors. As a result, it is difficult to transmit image data at a high speed.

SUMMARY OF THE INVENTION

It is an object of the present invention to at least partially solve the problems in the conventional technology.

There is provided a color printer system according to an aspect of the present invention including: an image data generating apparatus; and a printing apparatus, wherein the printing apparatus includes: an engine that superimposes a plurality of colors and performs printing; and a controller that controls the engine, the controller includes: a plurality of data transmitting units that transmits image data of each color to the engine; and a printing control unit that controls the plurality of data transmitting units, the printing control unit and the image data generating apparatus are connected to each other by a first transmission path through which control information is transmitted and received, the plurality of data transmitting units and the image data generating apparatus are connected to each other by a plurality of second transmission paths, which is allocated to each color that can be printed by the engine and through which the image data is transmitted, and the image data generating apparatus includes: an image data generating unit that performs bitmap expansion on a print job received from a host apparatus for each color that can be printed by the engine to generate image data; and a communication unit that sequentially allocates the image data of colors other than a color which is not used for the superimposed printing to the second transmission path, which is allocated to transmit the image data of the color that is not used for the superimposed printing, and transmits the image data in units of transmission when colors whose number is less by one or more than the number of all colors that can be printed by the engine.

There is provided a color printer system according to another aspect of the present invention including: an image data generating apparatus; and a printing apparatus, wherein the printing apparatus includes: an engine that performs printing; and a controller that controls the engine, the engine includes: an image output unit that superimposes a plurality of colors and performs printing; and a plurality of data transmitting units that receives image data of each color from the image data generating apparatus and transmits the image data of each color to the image output unit, and the controller includes a printing control unit that controls the plurality of data transmitting units, the printing control unit and the image data generating apparatus are connected to each other by a first transmission path through which control information is transmitted and received, the plurality of data transmitting units and the image data generating apparatus are connected to each other by a plurality of second transmission paths, which is allocated to each color that can be printed by the image output unit and through which the image data is transmitted, and the image data generating apparatus includes: an image data generating unit that performs bitmap expansion on a print job received from a host apparatus for each color that can be printed by the image output unit to generate image data; and a communication unit that sequentially allocates the image data of colors other than a color which is not used for the superimposed printing to the second transmission path, which is allocated to transmit the image data of the color that is not used for the superimposed printing, and transmits the image data in units of transmission when colors whose number is less by one or more than the number of all colors that can be printed by the image output unit are superimposed and printed.

There is provided a color printer system according to still another aspect of the present invention including: an engine that superimposes a plurality of colors and performs printing; an image data generating apparatus that performs bitmap expansion on a print job received from a host apparatus for each color that can be printed by the engine to generate image data; an engine controller that transmits the image data of each color received from the image data generating apparatus to the engine at an appropriate timing; and transmission paths which are allocated to respective colors that can be printed by the engine and through which the image data is transmitted from the image data generating apparatus to the engine controller, wherein the image data generating apparatus includes an image data transmitting unit that sequentially allocates the image data of colors other than a color which is not used for the superimposed printing to the transmission path, which is allocated to transmit the image data of the color that is not used for the superimposed printing, and transmits the image data in units of transmission, when colors whose number is less by one or more than the number of all colors that can be printed by the engine are superimposed and printed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating the order in which image data is transmitted through transmission paths during single-side printing that does not use a special color in the related art;

FIG. 4 is a diagram illustrating the order in which image data is transmitted through transmission paths during single-side printing that does not use a special color in the first embodiment;

FIG. 5 is a diagram illustrating the order in which image data is transmitted through transmission paths during double-side printing that does not use a special color in the first embodiment;

FIG. 8 is a diagram illustrating the order in which image data is transmitted through transmission paths used to transmit the image data of the front surface during printing that does not use a special color in the second embodiment when the printers for continuous form paper are connected in tandem;

FIG. 11B is a sequence diagram illustrating the printing process according to the third embodiment;

FIG. 11C is a sequence diagram illustrating the printing process according to the third embodiment;

FIG. 15 is a diagram illustrating the order of print pages according to the fourth embodiment;

FIG. 16A is a sequence diagram illustrating the transmission of image data from each image data transmitting unit to an engine.

DETAILED DESCRIPTION OF THE PREFERRED EMBODIMENTS

First Embodiment

<Embodiment of Cut Sheet Machine>

Figure 1:
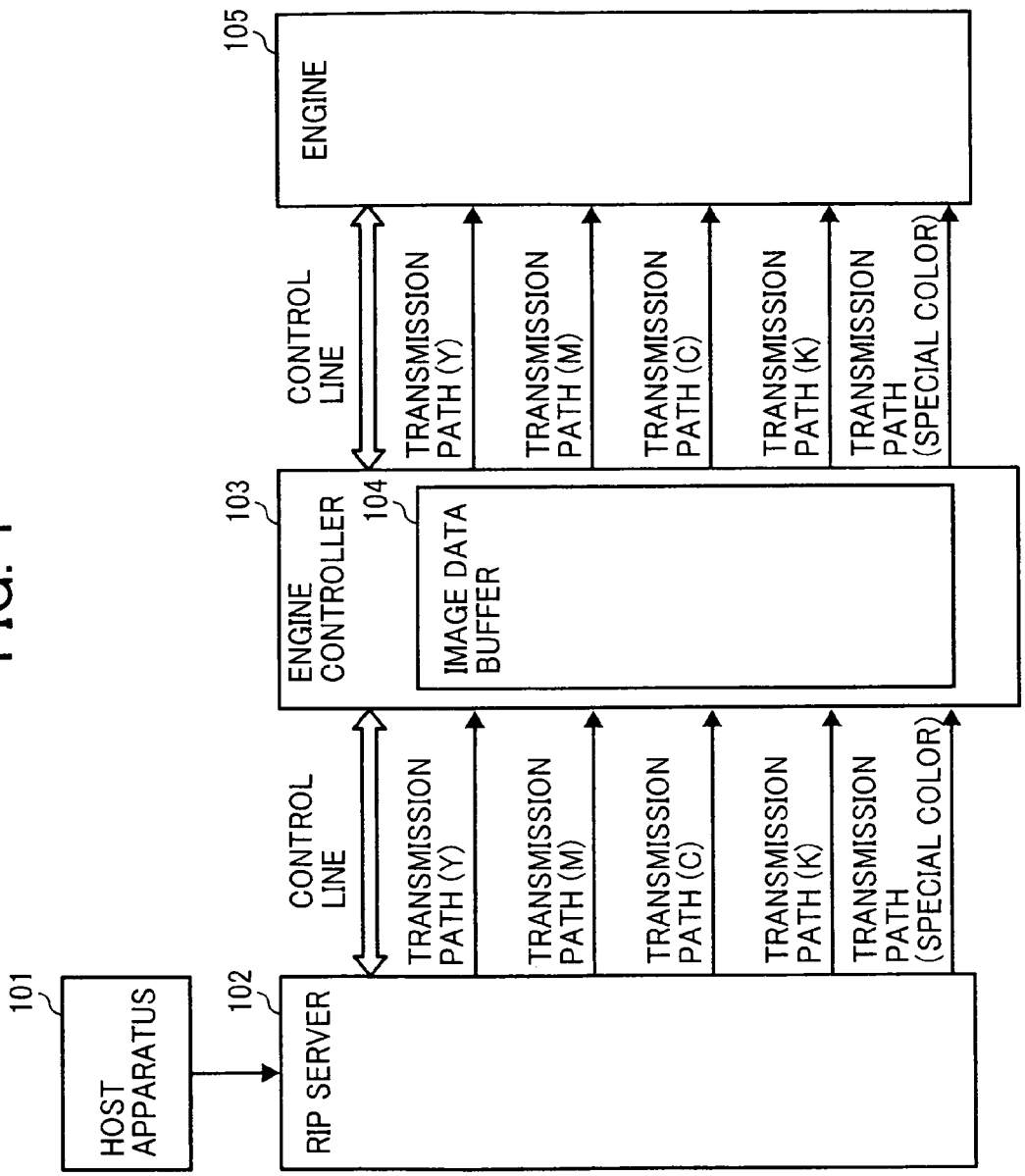
FIG. 1 is a block diagram illustrating the structure of a color printer system according to a first embodiment of the invention.

FIG. 1 is a block diagram illustrating the structure of a color printer system according to an embodiment of the invention.

This embodiment has the following characteristics when a printer having transmission paths corresponding to five colors (Y, M, C, K, and a special color) performs printing without using a special color.

That is, image data is transmitted in units of transmission (for example, in units of pages) through a transmission path, which is originally set for a special color that is not to be used in printing, such that the allocation of the image data is changed in the order of Y→M→C→K→Y→M→C→K. In this way, the image data is transmitted using all of five transmission paths.

The color printer system will be described in detail below with reference to the accompanying drawings.

As shown in FIG. 1, the color printer system according to this embodiment includes a RIP server 102, an engine controller 103, and an engine 105.

One control line and five transmission paths for each color of image data are connected between the RIP server 102 and the engine controller 103. The image data is transmitted between the RIP server 102 and the engine controller 103 while a command is transmitted therebetween through the control line. By using PCI-Express for the transmission path, even when image data is simultaneously transmitted through a plurality of transmission paths, there is no influence between the transmission rates of the image data.

Similarly, one control line and five transmission paths for each color of image data are connected between the engine controller 103 and the engine 105. Image data is transmitted between the engine controller 103 and the engine 105 while a command is transmitted therebetween through the control line.

In this embodiment, the transmission paths between the RIP server and the engine controller and the transmission paths between the engine controller and the engine may be physically a plurality of cables or one cable that is logically separated.

The RIP server 102 receives a print job from a host apparatus 101, analyzes the color of a picture image, and expands the image data to bitmap data. Then, the RIP server 102 notifies a page number to be transmitted and the color of image data to be transmitted to the engine controller 103 through the control line, and then transmits the image data expanded to the bitmap data through the transmission paths in an uncompressed state. In the transmission, image data of colors other than the colors allocated to the transmission paths may be transmitted. In this case, the RIP server 102 notifies the engine controller 103 of the color of image data to be transmitted through the control line in advance.

The engine controller 103 includes an image data buffer 104 and temporarily stores the image data transmitted from the RIP server 102. The image data buffer 104 may store the transmitted image data in an arbitrary area irrespective of the colors of the image data. When receiving the image data of all colors of the page to be printed, the engine controller 103 controls the engine 105 to perform printing.

The engine 105 superimposes five colors and performs printing. In this embodiment, the five colors are Y, M, C, K, and a special color. The special color may be a gold color or clear toner. However, the special color is not particularly limited, but may be any color.

Figure 2:
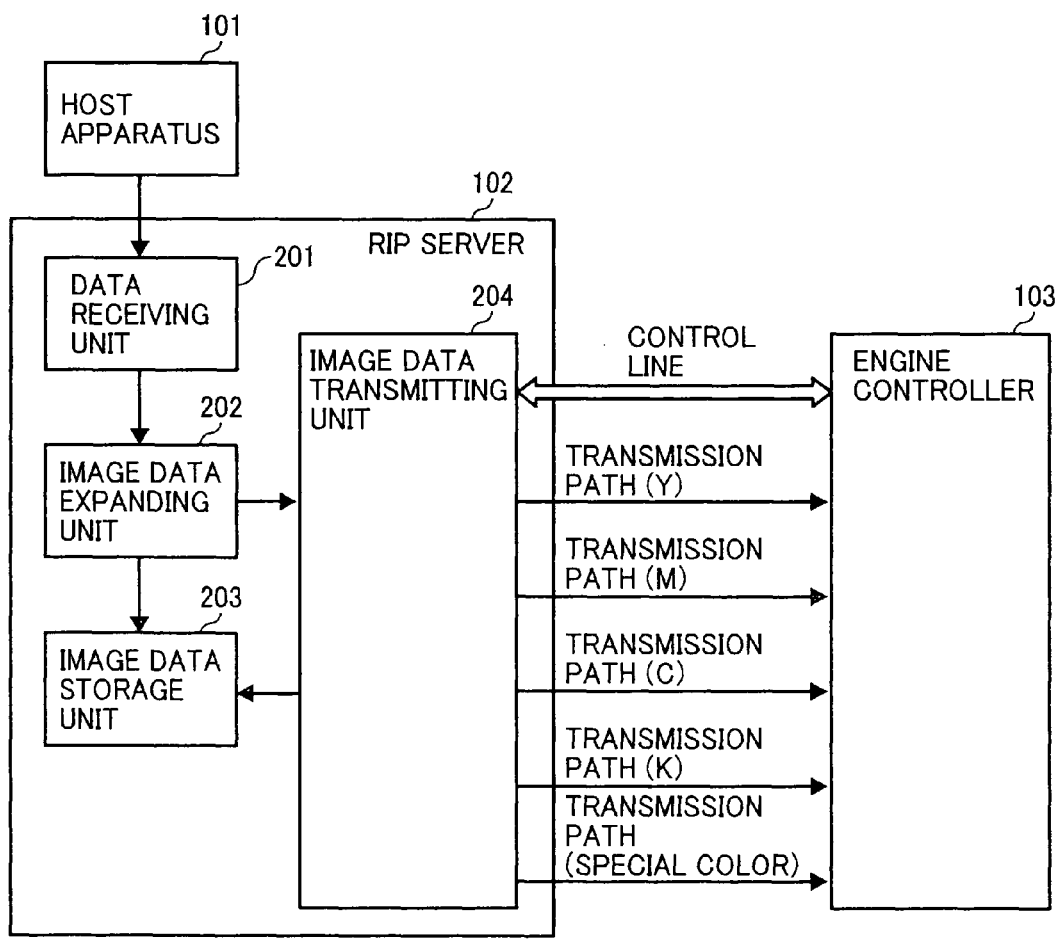
FIG. 2 is a block diagram illustrating the structure of a RIP server according to the first embodiment shown in FIG. 1.

FIG. 2 is a block diagram illustrating the structure of the RIP server 102.

A data receiving unit 201 receives a print job including print data and page information from the host apparatus 101 and transmits the print job to an image data expanding unit 202.

The image data expanding unit 202 separates the print data of the print job into five colors, that is, Y, M, C, K, and a special color, performs bitmap expansion on each, and stores the bitmap-expanded image data and the page information in an image data storage unit 203. Then, the image data expanding unit 202 notifies an image data transmitting unit 204 of the page information of the page whose image data has been expanded to the bitmap data.

The image data transmitting unit 204 notifies the engine controller 103 of the page number of the page to be transmitted and information; and the information is about which color of image data is included in the page. Then, the image data transmitting unit 204 transmits the image data to the engine controller 103. At that time, the transmission paths are repeatedly used to transmit data in the order of a transmission path (Y), a transmission path (M), a transmission path (C), a transmission path (K), and a transmission path (special color). The image data transmitting unit 204 selects image data to be transmitted based on the transmission path (transmission path corresponding to which color of image data to be transmitted) to be used for transmission, and the page number and color of the image data stored in the image data storage unit 203 (this logic will be described below with reference to FIG. 6). In this case, information indicating transmission conditions is added to the selected image data in order to prevent double transmission. The page number of the image data to be transmitted and the transmission path to be used for transmission are notified to the engine controller 103 through the control line. When the color of the image data to be transmitted is different from the color allocated to the transmission path, the color of the image data is also notified. Then, the image data is transmitted to the engine controller 103. When the transmission of the image data ends, the image data transmitting unit 204 deletes the image data from the image data storage unit 203.

FIG. 3 is a diagram illustrating the order in which image data is transmitted through each transmission path during single-side printing that does not using a special color in the related art.

Next, the order in which image data is transmitted from the RIP server to the engine controller according to the related art will be described.

It is assumed that, during the single-side printing of ten pages without using a special color, the time required for the RIP server to perform bitmap expansion to generate image data is shorter than the transmission time of image data from the RIP server to the engine controller. In addition, it is assumed that, in the symbols in FIG. 3 and the following description, for example, "1-Y" indicates Y image data of the first page.

First, in the first round, 1-Y is transmitted through the transmission path (Y), 1-M is transmitted through the transmission path (M), 1-C is transmitted through the transmission path (C), and 1-K is transmitted through the transmission path (K). Since there is no image data for a special color, no image data is transmitted through the transmission path (special color).

In the second round, 2-Y is transmitted through the transmission path (Y), 2-M is transmitted through the transmission path (M), 2-C is transmitted through the transmission path (C), and 2-K is transmitted through the transmission path (K). Since there is no image data for a special color, no image data is transmitted through the transmission path (special color). This transmission operation is repeated and ten rounds are required to transmit ten pages.

FIG. 4 is a diagram illustrating the order in which image data is transmitted through each transmission path during single-side printing without using a special color in this embodiment.

Next, the order in which image data is transmitted from the RIP server 102 to the engine controller 103 in this embodiment will be described. In this embodiment, it is assumed that, during the single-side printing of ten pages without using a special color, the time required for the RIP server 102 to perform bitmap expansion to generate image data is shorter than the transmission time of image data from the RIP server 102 to the engine controller 103.

In this embodiment, image data to be transmitted is determined by the following processes.

Process 1: when there is image data of the color allocated to the transmission path to be used for transmission, the image data of the first page in ascending order of page numbers is selected from the image data that has not been transmitted.

Process 2: when there is no image data of the color allocated to the transmission path to be used for transmission, Y, M, C, and K image data which are preferentially transmitted are selected from the image data of the first page in ascending order of page numbers.

First, in the first round, according to process 1, 1-Y is transmitted through the transmission path (Y), 1-M is transmitted through the transmission path (M), 1-C is transmitted through the transmission path (C), and 1-K is transmitted through the transmission path (K). Since there is no image data for a special color, image data to be transmitted is determined by process 2 and is then transmitted through the transmission path (special color). In this case, the first page in ascending order of page numbers is page 2 and 2-Y has not been transmitted. Therefore, 2-Y is transmitted through the transmission path (special color).

Then, in the second round, image data 3-Y is transmitted through the transmission path (Y) according to process 1 since the smallest page is page 3 among Y image data that have not been transmitted. Then, 2-M is transmitted through the transmission path (M), 2-C is transmitted through the transmission path (C), and 2-K is transmitted through the transmission path (K). Since there is no image data for a special color, image data to be transmitted is determined by process 2 and is then transmitted through the transmission path (for special color). In this case, the smallest page is page 3, and 3-Y starts to be transmitted. Since 3-M has not been transmitted, 3-M is transmitted through the transmission path (special color).

This operation is repeatedly performed to change the image data transmitted through the transmission path (special color) to Y, M, C, and K. The number of rounds required to transmit ten pages is two smaller than that of the related art. Since the time required for one round is equal to that according to the related art, the time required to transmit image data in this embodiment of the invention is shorter than that in the related art.

FIG. 5 is a diagram illustrating the order in which image data is transmitted through each transmission path during double-side printing that does not use a special color in this embodiment.

Next, the order in which image data is transmitted from the RIP server 102 to the engine controller 103 in this embodiment will be described. In this embodiment, it is assumed that, during the double-side printing of ten pages without using a special color, the time required for the RIP server 102 to perform bitmap expansion to generate image data is shorter than the transmission time of image data from the RIP server 102 to the engine controller 103. In addition, it is assumed that the pages are printed in the order of 2, 4, 1, 6, 3, . . . when the engine performs printing at the highest output, and the engine first performs printing on the rear surface of two pages and then performs printing on the front surface. In the symbols in FIG. 5 and the following description, for example, "1-Y" indicates Y image data of the page 1.

In this embodiment, image data to be transmitted is determined by the following processes.

Process 3: when there is image data of the color allocated to the transmission path to be used for transmission, the image data of the first page printed when the engine performs printing at the highest output is selected from the color image data that has not been transmitted.

Process 4: when there is image data of the color allocated to the transmission path to be used for transmission, Y, M, C, and K image data which are preferentially transmitted are selected from the image data of the first page printed when the engine performs printing at the highest output among the color image data that has not been transmitted.

In the single-side printing, the pages are printed in ascending order of page numbers, such as 1, 2, 3, . . . when the engine performs printing at the highest output. Therefore, process 4 can be also applied to single-side printing.

According to process 3 and process 4, the image data transmitted through the transmission path (special color) can be changed in the order of Y, M, C, and K. The number of rounds required to transmit ten pages is two smaller than that in the related art. The time required for one round in this embodiment is equal to that in the related art. Therefore, according to this embodiment, it is possible to shorten the transmission time of image data.

Figure 6:
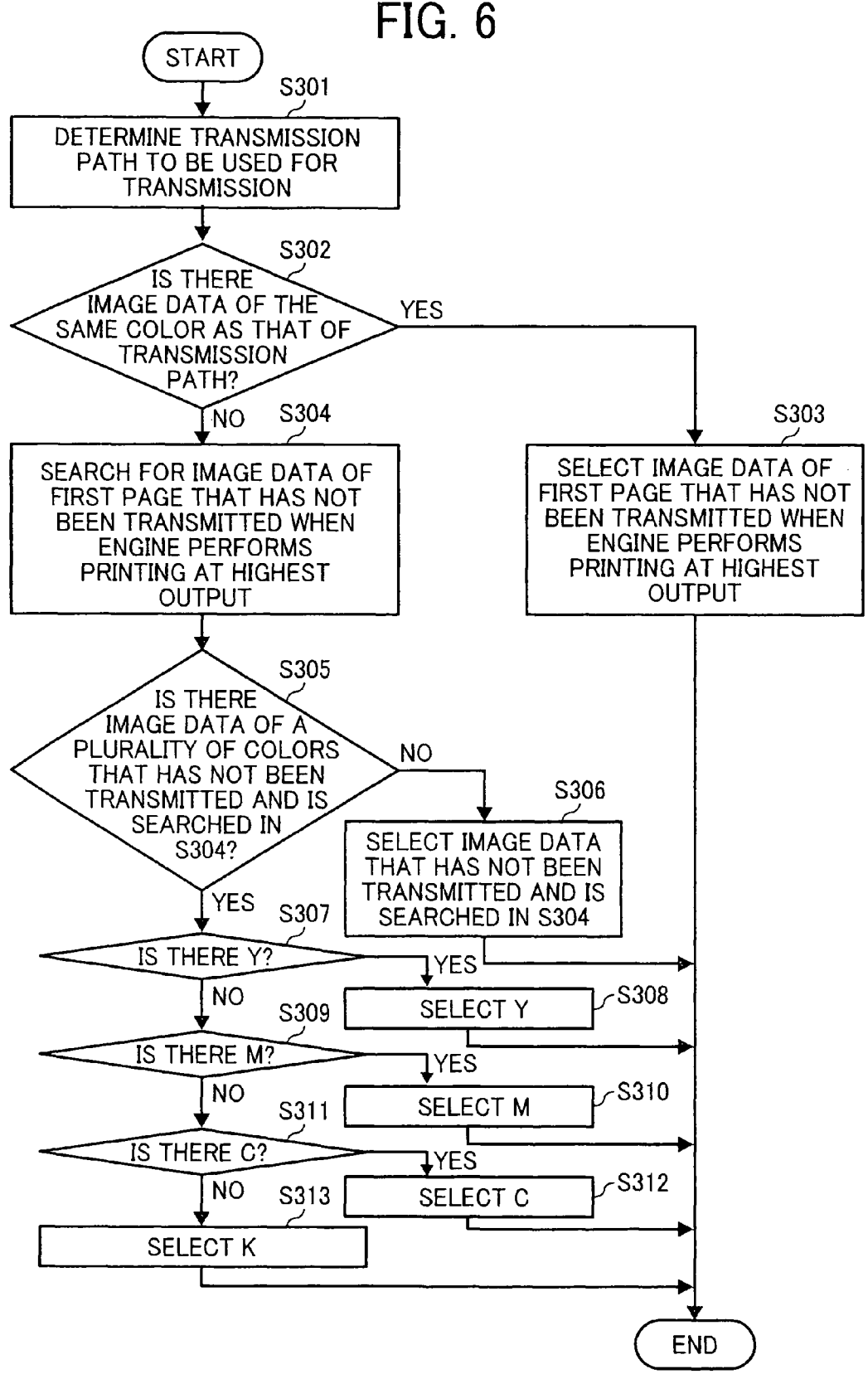
FIG. 6 is a flowchart illustrating a process of selecting image data according to the first embodiment.

FIG. 6 is a flowchart illustrating a process of selecting image data according to the embodiment of the invention.

The process of the image data transmitting unit 204 to transmit image data in the order shown in FIGS. 3 to 5 is as follows.

First, the image data transmitting unit 204 determines a transmission path for which color to be used for transmission (Step S301).

Then, the image data transmitting unit 204 determines whether there is image data, which is corresponding to the color of the transmission path to be used, among the image data that are stored in the image data storage unit 203 and have not been transmitted (Step S302).

In Step S302, when it is determined that there is image data corresponding to the color of the transmission path, the image data transmitting unit 204 selects image data of the page which is printed first when the engine performs printing at the highest output from the image data that has not been transmitted (Step S303).

In Step S302, when it is determined that there is no image data corresponding to the color transmission path, the image data transmitting unit 204 searches for image data of the page which is printed first when the engine performs printing at the highest output from the image data that has not been transmitted (Step S304).

Then, the image data transmitting unit 204 determines whether there is image data corresponding to a plurality of colors in the page of the image data searched in Step S304 (Step S305).

When it is determined in Step S305 that there is image data corresponding to only one color, the image data transmitting unit 204 selects the image data (Step S306).

When it is determined in Step S305 that there is image data corresponding to a plurality of colors, the image data transmitting unit 204 determines whether there is Y image data in the image data corresponding to the plurality of colors (Step S307).

When it is determined in Step S307 that there is Y image data, the image data transmitting unit 204 selects the Y image data (Step S308).

When it is determined in Step S307 that there is no Y image data, the image data transmitting unit 204 determines whether there is M image data in the image data corresponding to the plurality of colors (Step S309).

When it is determined in Step S309 that there is M image data, the image data transmitting unit 204 selects the M image data (Step S310).

When it is determined in Step S309 that there is no M image data, the image data transmitting unit 204 determines whether there is C image data in the image data corresponding to the plurality of colors (Step S311).

When it is determined in Step S311 that there is C image data, the image data transmitting unit 204 selects the C image data (Step S312).

When it is determined in Step S311 that there is no C image data, the image data transmitting unit 204 determines whether there is K image data in the image data corresponding to the plurality of colors (Step S313).

Since the image data transmitting unit 204 according to this embodiment has the above-mentioned structure, it can be applied to the single-side printing and double-side printing of a cut sheet and also applied to a printer for continuous paper and printers for continuous paper connected in tandem. In addition, the image data transmitting unit 204 can be applied to an engine that superimposes a plurality of colors to perform printing as well as the engine that superimposes five colors to perform printing in the case where printing is performed by superimposing colors whose number is smaller by one or more than the number of all colors which can be printed by the engine.

Second Embodiment

<Embodiment when Printers for Continuous Form Paper are Connected in Tandem>

Next, an exemplary embodiment when printers for continuous form paper are connected in tandem will be described. In the second embodiment, structures other than the following structure are the same as those in the first embodiment.

Figure 7:
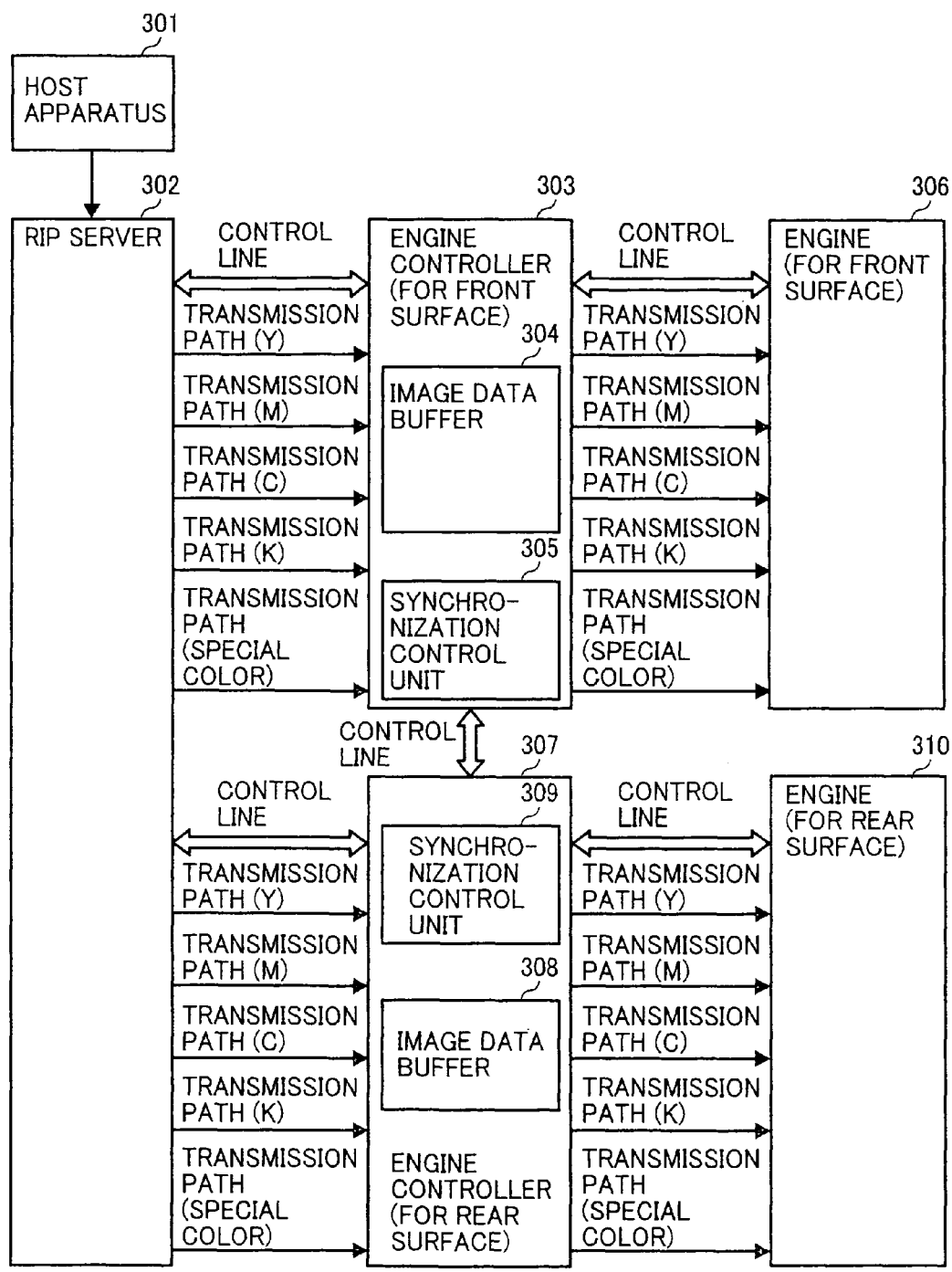
FIG. 7 is a block diagram illustrating the structure of a color printer system according to a second embodiment when printers for continuous form paper are connected in tandem.

FIG. 7 is a block diagram illustrating the structure of a color printer system according to this embodiment of the invention when the printers for continuous form paper are connected in tandem. As shown in FIG. 7, the color printer system according to this embodiment includes a RIP server 302, two engine controllers 303 and 307, and two engines 306 and 310.

One control line and five transmission paths for each color of image data item connected between the RIP server 302 and the engine controller 303 and between the RIP server 302 and the engine controller 307. Image data is transmitted between the RIP server and the engine controller while a command is transmitted therebetween through the control line. Similarly, one control line and five transmission paths for each color of image data are connected between the engine controller 303 and the engine 306 and between the engine controller 307 and the engine 310. Image data is transmitted between the engine controller and the engine while a command is transmitted therebetween through the control line.

In addition, the engine controllers 303 and 307 are connected to each other by one control line. Synchronization control units 305 and 309 synchronize the start and end of printing such that the interval of papers output by the engine 306 and that by the engine 310 is constant while exchanging commands using the control line.

The RIP server 302 receives a print job from a host apparatus 301 and transmits the image data of the front surface to the engine controller 303 and the image data of the rear surface to the engine controller 307. The engine 306 performs printing on odd-numbered pages, that is, page numbers 1, 3, 5, 7, . . . and the engine 310 performs printing on even-numbered pages, that is, page numbers 2, 4, 6, . . . .

FIG. 8 is a diagram illustrating the order in which image data is transmitted through each transmission path used to transmit the image data of the front surface during printing that does not use a special color, in the tandem connection of the printers for continuous form paper.

Next, the order in which image data is transmitted from the RIP server 302 to the engine controller 303 in this embodiment will be described. In this embodiment, it is assumed that, during the printing of ten odd-numbered pages among one to twenty pages without using a special color, the time required for the RIP server 302 to perform bitmap expansion to generate image data is shorter than the transmission time of image data from the RIP server 302 to the engine controller 303.

In this embodiment, image data to be transmitted is determined according to the above-mentioned processes 3 and 4. In this case, the pages are printed in ascending order of page numbers 1, 3, 5, . . . when the engine performs printing at the highest output.

According to the processes 3 and 4, it is possible to change the image data transmitted through the transmission path (special color) to Y, M, C, and K in this order. The number of rounds required to transmit ten pages is two smaller than that in the related art. Regarding the rear surface, the printing of ten even-numbered pages among one to twenty pages without using a special color is performed in the same way as described above. Therefore, the number of rounds required to transmit twenty pages is two smaller for each surface than that in the related art. Since the time required for one round is equal to that according to the related art, the time required to transmit image data in this embodiment of the invention is shorter than that in the related art.

Third Embodiment

In the first and second embodiments, a single engine controller is used to form an image of a plurality of colors. Alternatively, a color printer system according to a third embodiment has a hardware structure in which engine controllers are individually provided for each color.

A system has been known which has a structure in which engine controllers are individually provided for each color to transmit image data, in order to respond to a high-speed engine. In this system, image data can be transmitted through physically different transmission paths provided for each color. Therefore, the amount of image data transmitted per unit time increases, as compared to the system in which a physically integrated engine controller for colors is used. When performing image processing, the engine controllers can perform image processing in parallel. Therefore, it is possible to shorten the time required to transmit image data from the RIP server to the engine.

Next, the color printer system according to this embodiment will be described and a description of the same structure as that in the first and second embodiments will not be repeated.

Figure 9:
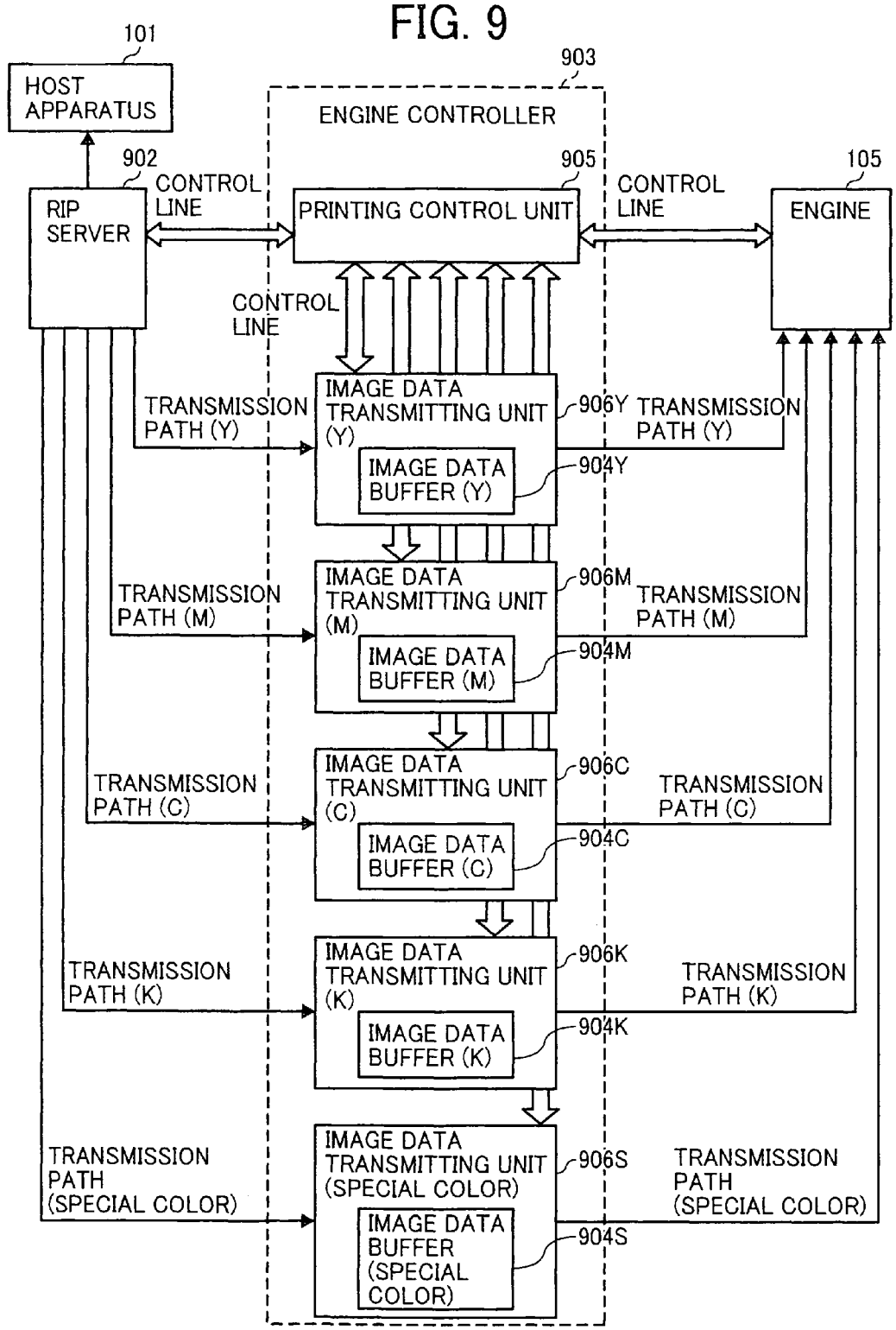
FIG. 9 is a block diagram illustrating the structure of a printer system according to a third embodiment.

FIG. 9 is a block diagram illustrating the structure of the color printer system according to the third embodiment. The color printer system according to this embodiment includes a RIP server 902, an engine controller 903, and an engine 105. The RIP server 902 is connected to a host apparatus 101 by a network. The host apparatus 101 and the engine 105 have the same function and structure as those in the first embodiment.

As shown in FIG. 9, the engine controller 903 includes a printing control unit 905 and five image data transmitting units 906Y to 906S corresponding to respective colors. The printing control unit 905 and the image data transmitting units 906Y to 906S are connected to each other by control lines.

The printing control unit 905 is connected to the RIP server 902 and the engine 105 by control lines through which various kinds of commands are transmitted. The printing control unit 905 transmits, to the image data transmitting units 906Y to 906S through the control lines, instructions to receive image data from the RIP server 902 or instructions to transmit image data to the engine 105.

The printing control unit 905 receives a notification indicating the reception of the image data from the image data transmitting units 906Y to 906S through the control lines or receives a notification indicating the completion of printing from the engine 105 through the control line.

The image data transmitting units 906Y to 906S are connected to the RIP server 902 through transmission paths (Y) to (S), respectively, and receives the image data of each color from the RIP server 902. In addition, the image data transmitting units 906Y to 906S are provided with image data buffers (Y) 904Y to (S) 904S, respectively, and individually store image data of each color received from the RIP server 902. The image data transmitting units 906Y to 906S are connected to the engine 105 through transmission paths (Y) to (S), respectively, receive a transmission instruction from the printing control unit 905, and transmit the image data stored in the image data buffers (Y) 904Y to (S) 904S to the engine 105. The printing control unit 905 transmits a printing request to the engine 105 such that the engine 105 prints the image data.

Figure 10:
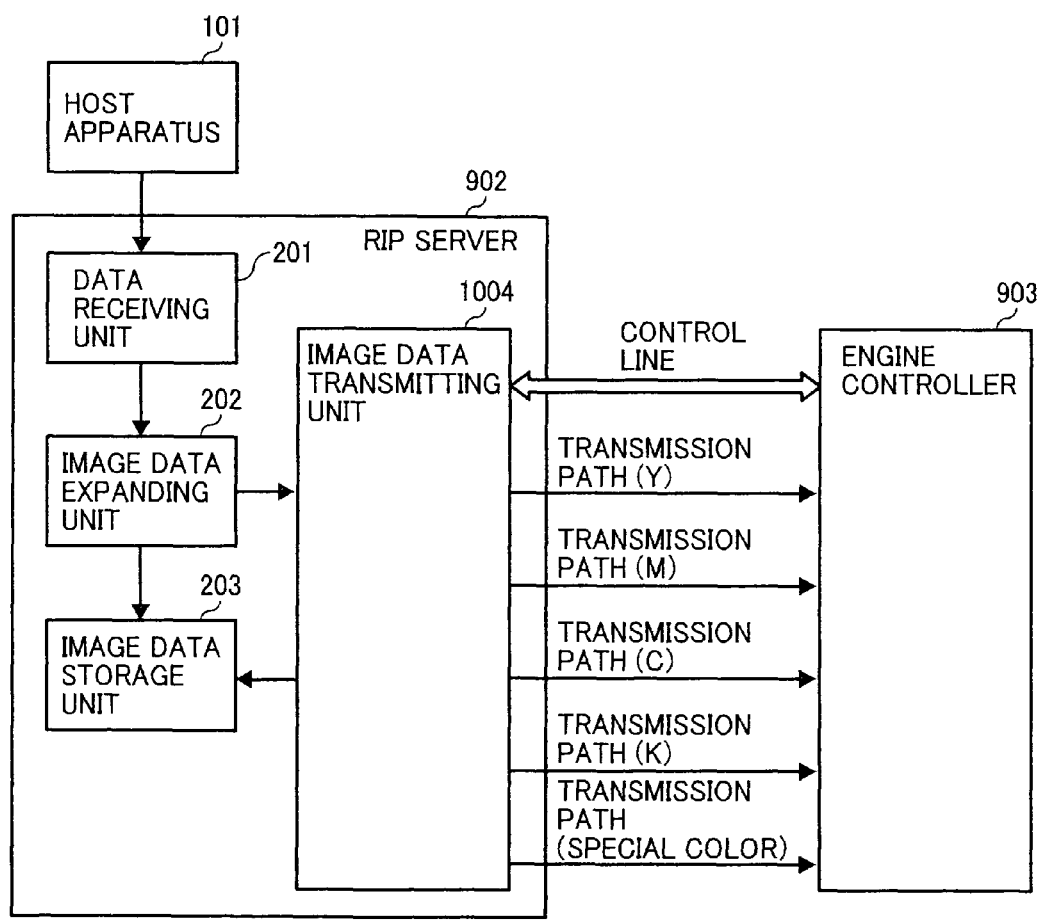
FIG. 10 is a block diagram illustrating the functional structure of a RIP server according to the third embodiment.

Next, the RIP server 902 will be described in detail. FIG. 10 is a block diagram illustrating the functional structure of the RIP server 902 according to the third embodiment. As shown in FIG. 10, the RIP server 902 according to this embodiment includes a data receiving unit 201, an image data expanding unit 202, an image data storage unit 203, and an image data transmitting unit 1004. The function and structure of each unit are the same as those in the first embodiment except that the image data transmitting unit 1004 is connected to the printing control unit 905 of the engine controller 903 by a control line and the image data transmitting unit 1004 is connected to the image data transmitting units 906Y to 906S of the engine controller 903 through the transmission paths (Y) to (S), respectively.

Figure 11A:
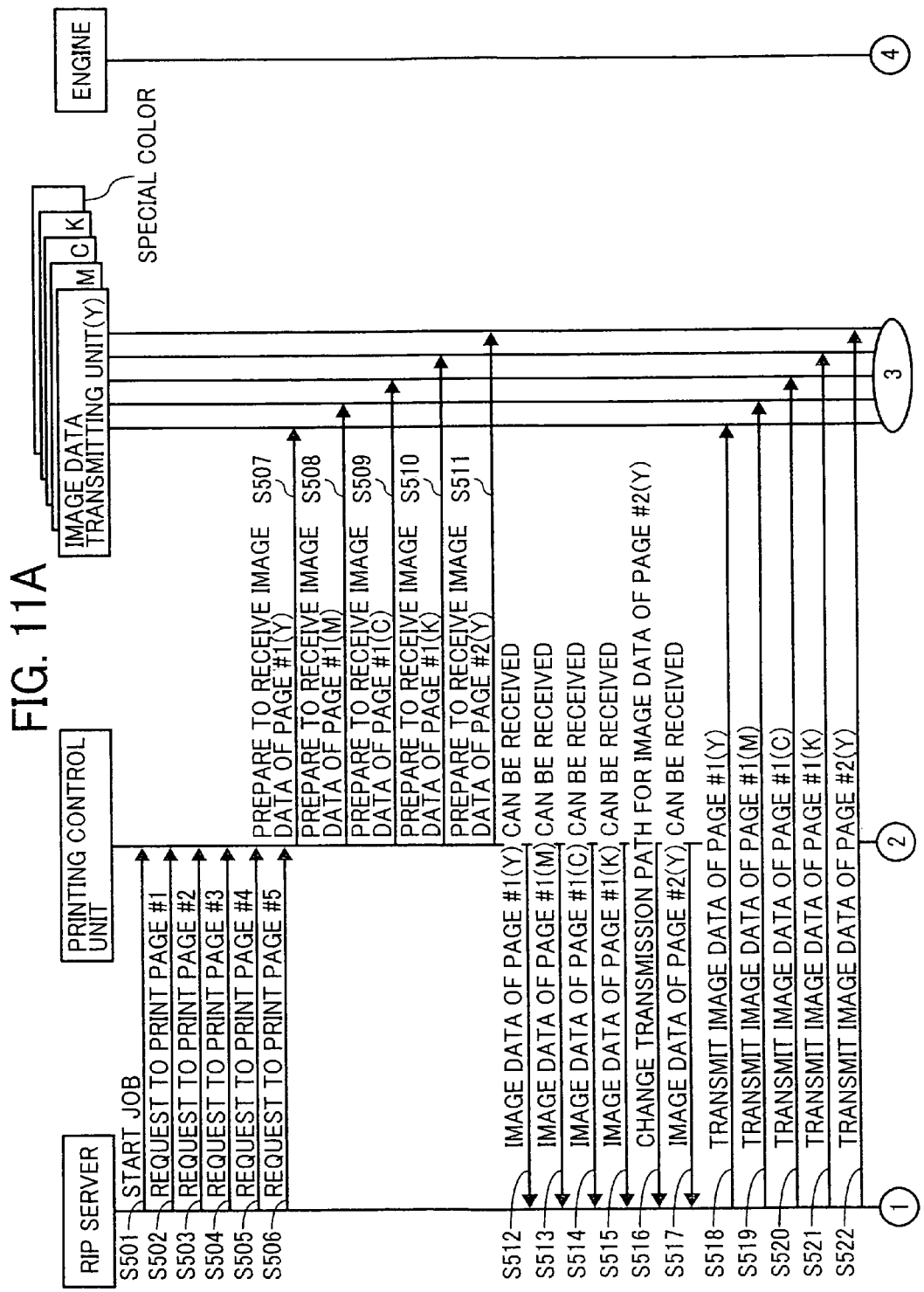
FIG. 11A is a sequence diagram illustrating a printing process according to the third embodiment.

Next, a printing process according to this embodiment will be described. FIGS. 11A to 11C are sequence diagrams illustrating the printing process according to the third embodiment. In this embodiment, it is assumed that the time required for the RIP server 902 to perform bitmap expansion on printing target data to generate image data is shorter than the transmission time of image data from the RIP server 902 to the engine controller 903.

First, an image transmission sequence between the RIP server 902 and the engine controller 903 will be described. When receiving a job, the RIP server 902 notifies the printing control unit 905 to start the job (Step S501).

Then, when the RIP of each page by the image data expanding unit 202 is completed, the image data transmitting unit 1004 of the RIP server 902 transmits a print request to the printing control unit 905. Color information of the image data is added to the print request (Steps S502 to S506).

The printing control unit 905 determines image data to be transmitted and transmission paths used to transmit the image data according to the process 3 described in the first embodiment, and notifies the image data transmitting units (Y) 906Y, (M) 906M, (C) 906C, and (K) 906K to prepare the reception of the image data (Steps S507 to S510).

Then, the printing control unit 905 determines image data to be transmitted and transmission paths used to transmit the image data according to the process 4 described in the first embodiment, and notifies the image data transmitting unit (special color) 906S to prepare the reception of the image data (Step S511). In the example of Step S511, it is determined that yellow (Y) image data is transmitted through the special color transmission path (S).

Then, the printing control unit 905 notifies the RIP server 902 that the image data (Y), (M), (C), and (K) of page 1 can be received (Steps S512 to S515). In addition, the printing control unit 905 notifies the RIP server 902 that the transmission path for transmitting the image data (Y) of page 2 has been changed to the transmission path (special color) (Step S516). Then, the printing control unit 905 notifies the RIP server 902 that the image data (Y) of page 2 can be received (Step S517).

The image data transmitting unit 1004 of the RIP server 902 transmits the image data (Y), (M), (C), and (K) of page 1 and the image data (Y) of page 2 to the image data transmitting units (Y) 906Y to (special color) 906S of the engine controller 903 (Steps S518 to S522).

Then, the image data transmitting unit (Y) 906Y receives the image data (Y) and notifies the printing control unit 905 that the reception of the image data (Y) of page 1 has been completed (Step S523). When receiving the notification, the printing control unit 905 notifies the RIP server 902 that the reception of the image data (Y) of page 1 has been completed (Step S524).

Then, since the transmission path (Y) is in an empty state, the printing control unit 905 determines image data to be transmitted and transmission paths used to transmit the image data according to the above-mentioned process 3 and notifies the image data transmitting unit (Y) 906Y to prepare the reception of the image data (Step S525). In addition, the printing control unit 905 notifies the RIP server 902 that the image data (Y) of page 3 can be received (Step S526). Then, the RIP server 902 transmits the image data (Y) of page 3 to the image data transmitting unit (Y) 906Y (Step S527).

Then, the image data (M), (C), and (K) of page 2 are transmitted from the RIP server 902 to the image data transmitting units 906Y to 906S of the engine controller 903 by the same process as that from Step S523 to Step S527 (Steps S528 to S543).

Then, the image data transmitting unit (special color) 906S notifies the printing control unit 905 that the reception of the image data (Y) of page 2 has been completed (Step S544). Then, the printing control unit 905 notifies the RIP server 902 that the reception of the image data (Y) of page 2 has been completed (Step S545).

Since the transmission path (special color) is in an empty state, the printing control unit 905 determines image data to be transmitted and transmission paths used to transmit the image data according to the above-mentioned process 4 and notifies the image data transmitting unit (special color) 906S to prepare the reception of the image data (Step S546). In the example shown in FIG. 11B, the printing control unit 905 notifies the image data transmitting unit (special color) 906S to prepare the reception of the image data (M) of page 3. Then, the printing control unit 905 notifies the RIP server 902 to change the transmission path to the transmission path (special color) and transmit the image data (M) of page 3 through the transmission path (special color) (Step S547). Then, the printing control unit 905 transmits a request to receive the image data (M) of page 3 (Step S549). When receiving the request, the RIP server 902 transmits the image data (M) of page 3 to the image data transmitting unit (special color) 906S (Step S550).

Next, an image transmission sequence between the engine controller 903 and the engine 105 will be described.

When each of the image data transmitting units 906Y to 906S receives all image data of page 1 from the RIP server 902, the printing control unit 905 requests the engine 105 to print page 1 (Step S539). When the engine 105 is ready for printing, it notifies the printing control unit 905 that printing is available (Step S548).

The printing control unit 905 notifies the image data transmitting unit (Y) 906Y of the transmission of the image data (Y) of page 1 (Step S551). The image data transmitting unit (Y) 906Y transmits the image data (Y) of page 1 to the engine 105 (Step S552).

The image data (M), (C), and (K) of page 1 are transmitted to the engine 105 from the image data transmitting units 906M to 906K by the same process as that in Steps S551 and S552 (Steps S553 to S558).

When the transmission of the image data is completed, the image data transmitting units 906M to 906K notify the printing control unit 905 that the transmission of the image data has been completed (Steps S559 to S562).

As such, in this embodiment, it is possible to change the image data transmitted through the transmission path (special color) to Y, M, C, and K. The number of rounds required to transmit ten pages is two smaller than that in the related art. Since the time required for one round is equal to that according to the related art, the time required to transmit image data in this embodiment is shorter than that in the related art.

Modification of Third Embodiment

Figure 12:
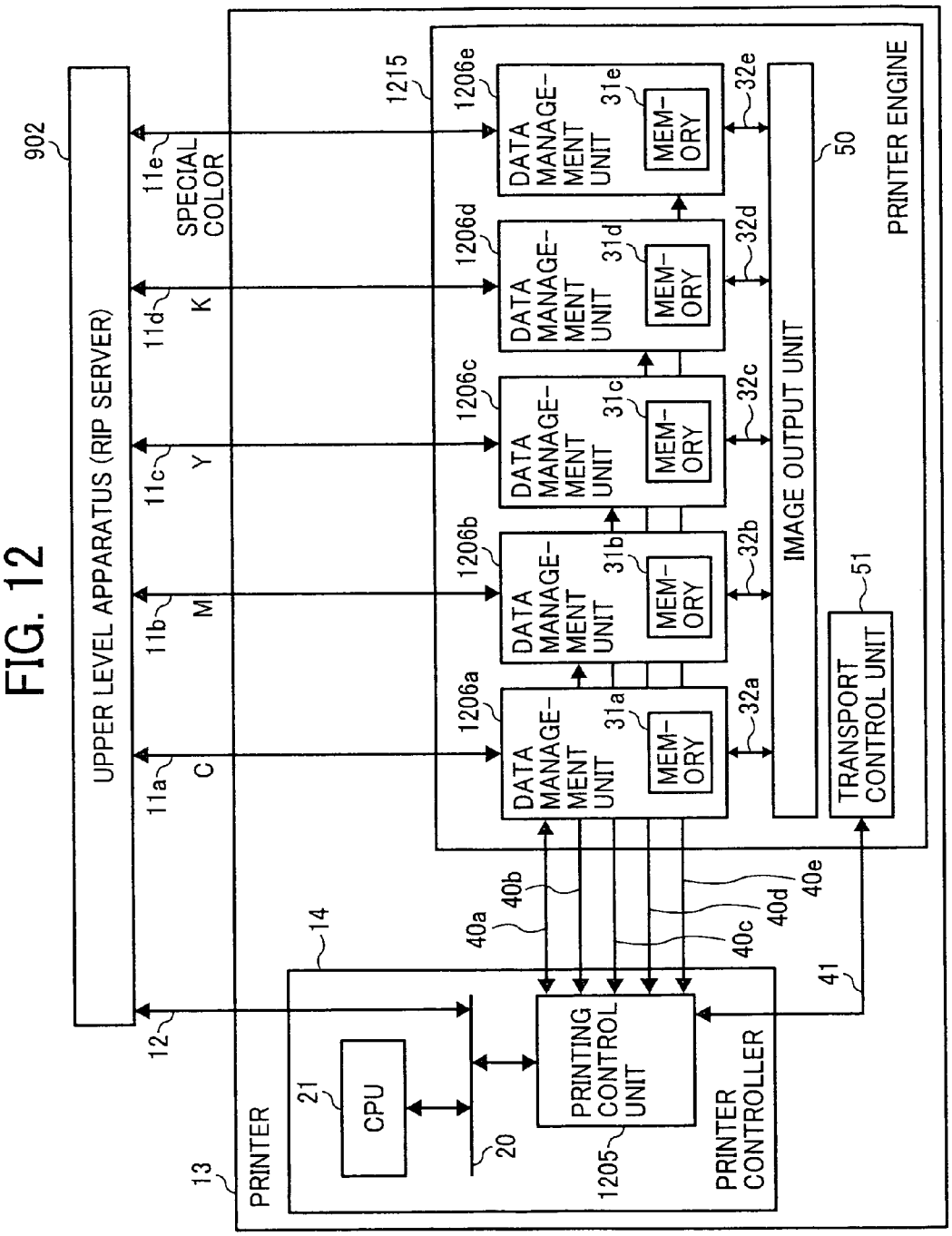
FIG. 12 is a block diagram illustrating the functional structure of a printer according to a modification of the third embodiment.

The structure of the printer including the engine controller 903 and the engine 105 according to the third embodiment may be changed as shown in FIG. 12. FIG. 12 is a block diagram illustrating the functional structure of a printer 13 according to a modification of the third embodiment.

The printer 13 according to this modification includes a printer controller 14 and a printer engine 1215.

The printer controller 14 is connected to an upper level apparatus (RIP server) 902 by a control line 12 and transmits or receives control information to or from the upper level apparatus (RIP server) 902 through the control line 12 to control a printing operation. The printer engine 1215 is connected to the upper level apparatus (RIP server) 902 by a plurality of data lines 11a, 11b, 11c, and 11d, and performs a printing process on the basis of print image data of each color transmitted from the upper level apparatus (RIP server) 902 through the data lines 11a, 11b, 11c, and 11d under the control of the printer controller 14.

The printer controller 14 includes a CPU 21 and a printing control unit 1205. The CPU 21 and the printing control unit 1205 are connected to a bus 20 such that they can communicate with each other. The control line 12 is also connected to the bus 20 through a communication I/F (not shown). The CPU 21 is operated according to a program stored in a ROM (not shown) to control the overall operation of the printer 13. The printing control unit 1205 transmits or receives commands or status information to or from the printer engine 1215 on the basis of control information transmitted between the upper level apparatus (RIP server) 902 and the printer 13 through the control line 12, thereby controlling the operation of the printer engine 1215.

In this modification, the printing control unit 1205 has the same structure as the printing control unit 905 of the engine controller 903 according to the third embodiment.

The printer engine 1215 includes a plurality of data management units 1206a, 1206b, 1206c, 1206d, and 1206e, an image output unit 50 that outputs an image to a paper on the basis of the print image data, and a transport control unit 51 that controls the transport of a print paper.

The data management units 1206a to 1206e have the same function as the image data transmitting units 906Y to 906S according to the third embodiment. That is, in this modification, the data management units 1206a to 1206e are provided in the printer engine, not the printer controller. The image output unit 50 has the same function as the engine 105 according to the third embodiment.

In the printing process according to this modification, the process shown in FIGS. 11A to 11C is performed between the upper level apparatus (RIP server) 902, and the printing control unit 1205, the data management units 1206a to 1206e, and the image output unit 50 of the printer 13.

Fourth Embodiment

A printer according to a fourth embodiment includes an engine that performs printing on both sides of a continuous paper, an engine controller corresponding to the printing of the front surface of the continuous paper, and an engine controller corresponding to the printing of the rear surface of the continuous paper.

Figure 13:
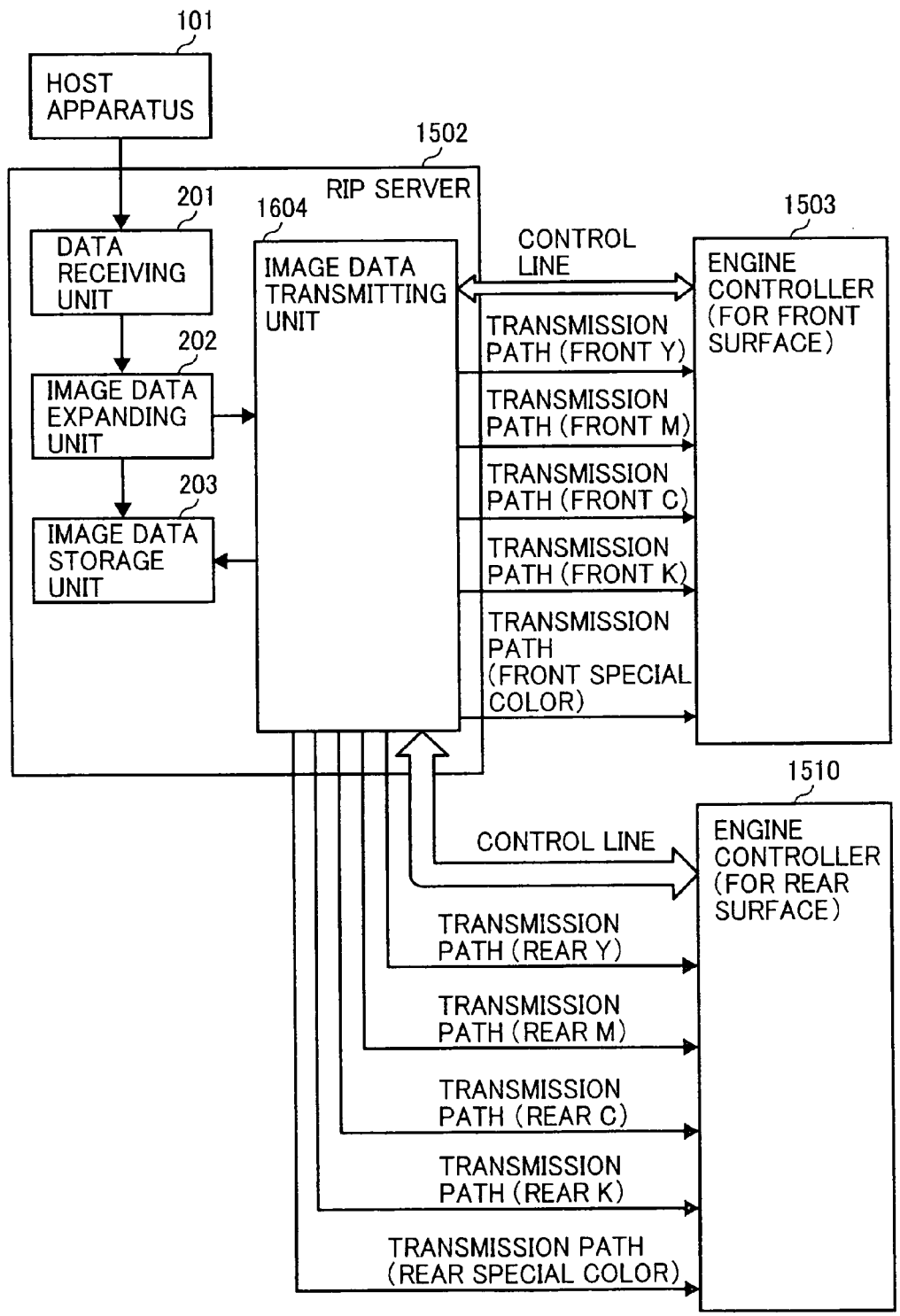
FIG. 13 is a block diagram illustrating the structure of a printer system according to a fourth embodiment.

FIG. 13 is a block diagram illustrating the structure of a printer system according to the fourth embodiment. The printer system according to this embodiment includes a RIP server 1502, an engine controller 1503 for the front surface, an engine controller 1510 for the rear surface, and an engine 105 (see FIG. 14). The RIP server 1502 is connected to a host apparatus 101 by a network. The host apparatus 101 and the engine 105 have the same function and structure as those in the first and second embodiments.

As shown in FIG. 13, the RIP server 1502 includes a data receiving unit 201, an image data expanding unit 202, an image data storage unit 203, and an image data transmitting unit 1604. The function and structure of each unit are the same as those in the first embodiment except that the image data transmitting unit 1604 is connected to a printing control unit 1505 of the engine controller 1503 and a printing control unit 1508 of the engine controller 1510 by control lines and the image data transmitting unit 1604 is connected to image data transmitting units 1506Y to 1506S of the engine controller 1503 and image data transmitting units 1509Y to 1509S of the engine controller 1510 by transmission paths (Y) to (S) (see FIG. 14).

Figure 14:
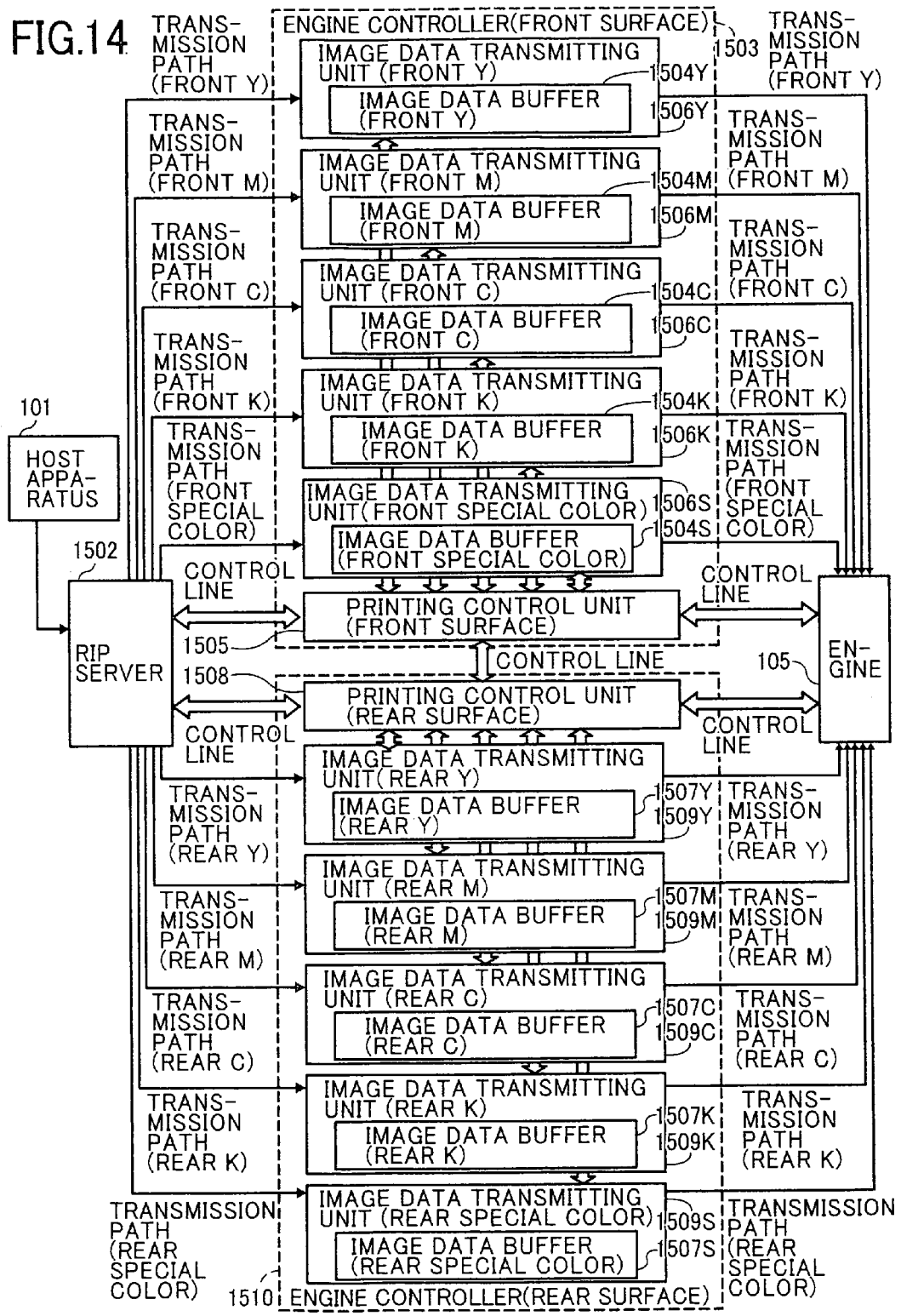
FIG. 14 is a block diagram illustrating the functional structure of two engine controllers.

FIG. 14 is a block diagram illustrating the functional structure of the two engine controllers 1503 and 1510. As shown in FIG. 14, the engine controller 1503 for the front surface includes a printing control unit 1505 and five image data transmitting units 1506Y to 1506S corresponding to each color. The printing control unit 1505 and the image data transmitting units 1506Y to 1506S are connected to each other by control lines.

The engine controller 1510 for the rear surface includes a printing control unit 1508 and five image data transmitting units 1509Y to 1509S corresponding to each color. The printing control unit 1508 and the image data transmitting units 1509Y to 1509S are connected to each other by control lines.

The printing control unit 1505 of the engine controller 1503 for the front surface is connected to the RIP server 1502 and the engine 105 by control lines for transmitting and receiving various kinds of commands. The printing control unit 1505 transmits an instruction to receive image data from the RIP server 1502 or an instruction to transmit image data to the engine 105 to the image data transmitting units 1506Y to 1506S through the control lines.

The printing control unit 1505 receives a notice of the reception of image data from the image data transmitting units 1506Y to 1506S or a notice of the completion of printing from the engine 105.

The image data transmitting units 1506Y to 1506S are connected to the RIP server 1502 through the transmission paths (Y) to (S), respectively, and receive the image data of each color from the RIP server 1502. The image data transmitting units 1506Y to 1506S are provided with image data buffers (Y) 1504Y to (S) 1504S, respectively, and store the image data of each color received from the RIP server 1502. The image data transmitting units 1506Y to 1506S are respectively connected to the engine 105 through the transmission paths (Y) to (S), receive a transmission instruction from the printing control unit 1505, and transmit the image data stored in each of the image data buffers (Y) 1504Y to (S) 1504S to the engine 105. The printing control unit 1505 transmits a print request to the engine 105 such that the engine 105 prints the image data.

The engine controller 1510 for the rear surface has the same structure as the engine controller 1503 for the front surface.

FIG. 15 is a diagram illustrating the order of print pages in the fourth embodiment. In FIG. 15, an arrow indicates the transport direction of the continuous paper. The print width of the engine 105 corresponds to two continuous papers. The left half of the engine 105 performs printing on the front surface, and the right half thereof performs printing on the rear surface. First, a continuous paper passes through the left side of the engine 105 and printing is performed on only the front surface of the continuous paper. The continuous paper having the printed front surface is inverted and passes through the right side of the engine 105 such that printing is performed on the rear surface. In this case, page #2 is printed on the rear surface of page #1, and page #4 is printed on the rear surface of page #3. Therefore, there is an interval between a page that is printed by the left side of engine 105 and a page that is printed by the right side thereof. This interval corresponds to the amount for which the continuous paper is conveyed from the left side of the engine 105 to the right side thereof, and is kept constant while being printed.

In this embodiment, the amount of page interval in continuous paper between the right side of and the left side of the engine 105 corresponds to five pages. First, page #1, page #3, page #5, page #7, and page #9 are printed on the left side of the engine 105. Then, page #11 is printed on the left side and page #2 is printed on the right side of the engine 105. Then, similarly, page #13 and page #4 are printed, respectively.

The RIP server 1502 according to this embodiment determines the front and rear surfaces of the page, and selects a printing control unit that requests printing. Printing is requested in the order of pages. Image data is transmitted from the RIP server 1502 to each image data transmitting unit by the same sequence as that in the third embodiment.

Figure 16B:
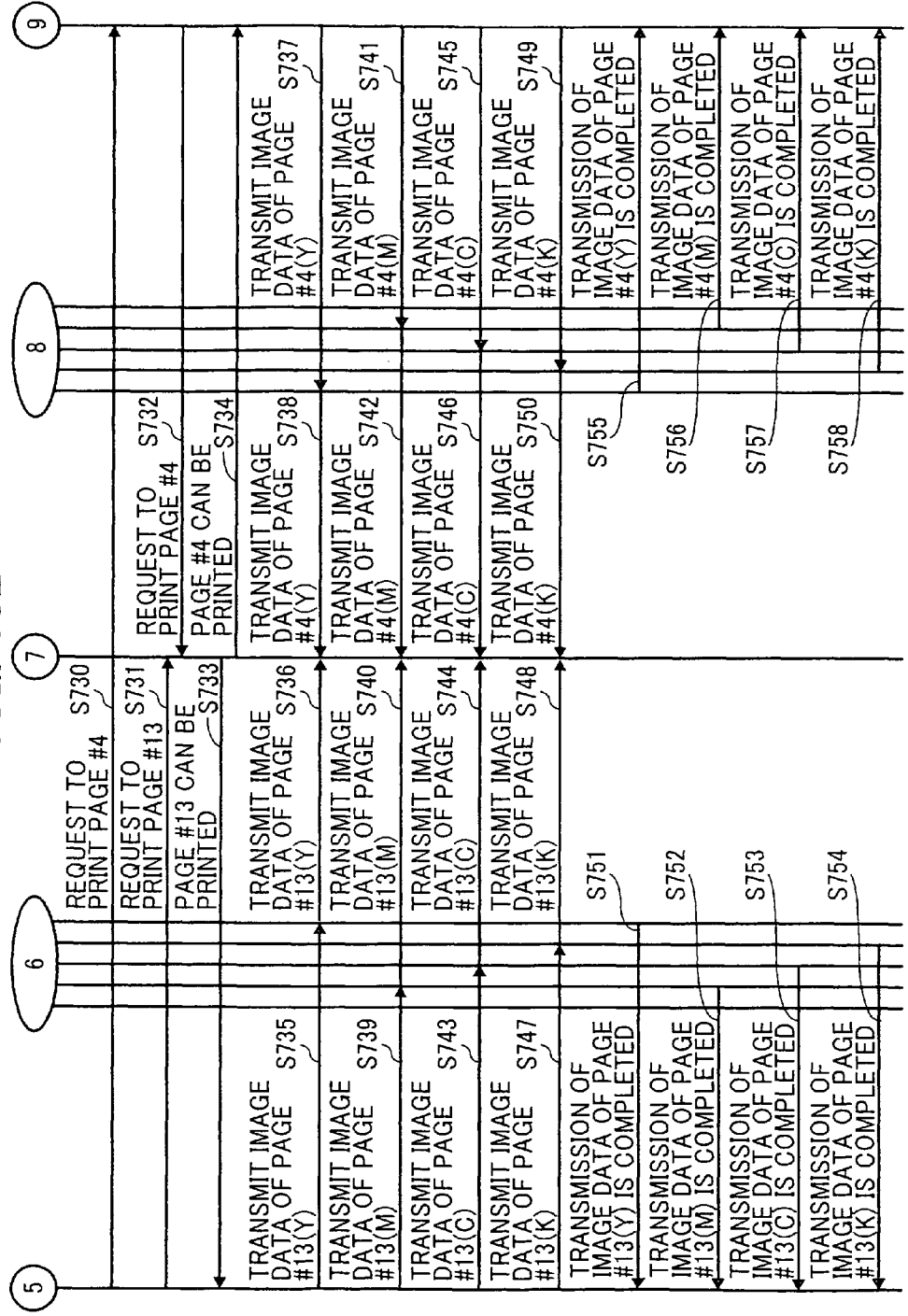
FIG. 16B is a sequence diagram illustrating the transmission of image data from each image data transmitting unit to the engine.

FIGS. 16A and 16B are diagrams illustrating a sequence of the transmission of image data from each image data transmitting unit to the engine 105.

The printing control unit 1505 for the front surface detects that the page interval between the front surface and rear surface corresponds to five pages, and prints page #1, page #3, page #5, page #7, and page #9, similar to the second embodiment.

The image data transmitting units 1506Y to 1506S of the engine controller 1503 for the front surface receive the image data of page #11 and page #13 from the RIP server 1502. That is, the image data of page #11(Y) is stored in the image data transmitting unit (front Y) 1506Y, the image data of page #11(M) is stored in the image data transmitting unit (front M) 1506M, the image data of page #11(C) is stored in the image data transmitting unit (front C) 1506C, the image data of page #11(K) is stored in the image data transmitting unit (front K) 1506K, the image data of page #13(Y) is stored in the image data transmitting unit (front special color) 1506S, the image data of page #13(M) is stored in the image data transmitting unit (front M) 1506M, the image data of page #13(C) is stored in the image data transmitting unit (front C) 1506C, and the image data of page #13(K) is stored in the image data transmitting unit (front K) 1506K.

The image data transmitting units 1509Y to 1509S of the engine controller 1510 for the rear surface receives the image data of page #2 and page #4 from the RIP server 1502. That is, the image data of page #2(Y) is stored in the image data transmitting unit (rear Y) 1509Y, the image data of page #2(M) is stored in the image data transmitting unit (rear M) 1509M, the image data of page #2(C) is stored in the image data transmitting unit (rear C) 1509C, the image data of page #2(K) is stored in the image data transmitting unit (rear K) 1509K, the image data of page #4(Y) is stored in the image data transmitting unit (rear special color) 1509S, the image data of page #4(M) is stored in the image data transmitting unit (rear M) 1509M, the image data of page #4(C) is stored in the image data transmitting unit (rear C) 1509C, and the image data of page #4(K) is stored in the image data transmitting unit (rear K) 1509K.

Then, when detecting that the image data of all colors of page #11 is received, the printing control unit 1505 for the front surface instructs the printing control unit 1508 for the rear surface to print page #2 (Step S701). The printing control unit 1508 for the front surface requests the engine 105 to print page #11, similar to the second embodiment (Step S702). The printing control unit 1505 for the front surface instructs each of the image data transmitting units 1506Y to 1506K to transmit image data (Steps S706, S710, S714, and S718). Each of the image data transmitting units 1506Y to 1506K transmits image data to the engine 105, and the engine 105 prints page #11 (Steps S707, S711, S715, and S719). After the transmission of the image data is completed, each of the image data transmitting units 1506Y to 1506K for the front surface notifies the printing control unit 1505 for the front surface that the transmission of the image data has been completed (Steps S722, S723, S724, and S725).

The printing control unit 1508 for the rear surface requests the engine 105 to print page #2, similar to the second embodiment (Step S703). Then, the printing control unit 1508 for the rear surface instructs the image data transmitting units 1509Y to 1509K to transmit image data (Steps S708, S712, S716, and S720). Each of the image data transmitting units 1509Y to 1509K transmits image data to the engine 105 and the engine 105 prints page #2 (Steps S709, S713, S717, and S721). After the transmission of the image data is completed, each of the image data transmitting units 1509Y to 1509K for the rear surface notifies the printing control unit 1508 for the rear surface that the transmission of the image data has been completed (Steps S726, S727, S728, and S729). Similarly, page #13 and page #4 are printed (Steps S730 to S758).

The printing control unit 1505 for the front surface instructs the image data transmitting unit (front special color) 1506S to transmit the image data of page #13(Y) (Step S735). Then, the image data transmitting unit (front special color) 1506S transmits the image data of page #13(Y) to the engine 105 and the engine 105 prints page #13(Y) (Step S736).

The printing control unit 1508 for the rear surface instructs the image data transmitting unit (rear special color) 1509S to transmit the image data of page #4(Y) (Step S737). Then, the image data transmitting unit (rear special color) 1509S transmits the image data of page #4(Y) to the engine 105 and the engine 105 prints page #4(Y) (Step S738).

As such, in this embodiment, it is possible to change the image data transmitted through the transmission path (special color) to Y, M, C, and K. The number of rounds required to transmit ten pages is two smaller than that in the related art. Since the time required for one round is equal to that according to the related art, the time required to transmit image data in this embodiment is shorter than that in the related art.

According to the invention, the transmission path for a special color that is not used for printing is effectively used to transmit image data. Therefore, in particular, when printing is performed with four colors, that is, Y, M, C, and K, without using a special color, it is possible to significantly shorten the time required to transmit the image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color printer system comprising:
an image data generating apparatus; and
a printing apparatus, wherein
the printing apparatus includes:
an engine that superimposes a plurality of colors and performs printing; and
a controller that controls the engine, the controller includes:
a plurality of data transmitting units that transmits image data of each color to the engine; and a printing control unit that controls the plurality of data transmitting units, the printing control unit and the image data generating apparatus are connected to each other by a first transmission path through which control information is transmitted and received, the plurality of data transmitting units and the image data generating apparatus are connected to each other by a plurality of second transmission paths, which is allocated to each color that can be printed by the engine and through which the image data is transmitted, and the image data generating apparatus includes:
- an image data generating unit that performs bitmap expansion on a print job received from a host apparatus for each color that can be printed by the engine to generate image data; and
- a communication unit that sequentially allocates the image data of colors other than a color which is not used for the superimposed printing to the second transmission path, which is allocated to transmit the image data of the color that is not used for the superimposed printing, and transmits the image data in units of transmission when colors whose number is less by one or more than the number of all colors that can be printed by the engine.

2. The color printer system according to claim 1, wherein the controller includes:
- a first controller that controls the engine to perform printing on a first surface of a recording medium; and
- a second controller that controls the engine to perform printing on a second surface of the recording medium, and
- each of the first and second controllers includes the plurality of data transmitting units and the printing control unit.

3. The color printer system according to claim 2, wherein the image data transmitting unit performs:

a first process for selecting the image data of a page that is printed first when the engine performs printing at the highest output among the image data of the color which has not been transmitted, when there is the image data of the color allocated to the second transmission path to be used for transmission; and a second process for selecting data to be transmitted according to priority which is given to the colors in advance from the image data of the page that is printed first when the engine performs printing at the highest output, among the image data which has not been transmitted, when there is no image data of the color allocated to the second transmission path to be used for transmission, and the image data transmitting unit selects image data to be transmitted using the first and second processes.

4. The color printer system according to claim 2, wherein PCI-Express is used for the second transmission path.

5. The color printer system according to claim 3, wherein PCI-Express is used for the second transmission path.

6. The color printer system according to claim 1, wherein the image data transmitting unit performs:

a first process for selecting the image data of a page that is printed first when the engine performs printing at the highest output among the image data of the color which has not been transmitted, when there is the image data of the color allocated to the second transmission path to be used for transmission; and a second process for selecting data to be transmitted according to priority which is given to the colors in advance from the image data of the page that is printed first when the engine performs printing at the highest output, among the image data which has not been transmitted, when there is no image data of the color allocated to the second transmission path to be used for transmission, and the image data transmitting unit selects image data to be transmitted using the first and second processes.

7. The color printer system according to claim 1, wherein PCI-Express is used for the second transmission path.

8. The color printer system according to claim 6, wherein PCI-Express is used for the second transmission path.

9. A color printer system comprising:
an image data generating apparatus; and
a printing apparatus, wherein
the printing apparatus includes:
- an engine that performs printing; and
- a controller that controls the engine,
the engine includes:
  - an image output unit that superimposes a plurality of colors and performs printing; and
  - a plurality of data transmitting units that receives image data of each color from the image data generating apparatus and transmits the image data of each color to the image output unit, and
the controller includes a printing control unit that controls the plurality of data transmitting units, the printing control unit and the image data generating apparatus are connected to each other by a first transmission path through which control information is transmitted and received, the plurality of data transmitting units and the image data generating apparatus are connected to each other by a plurality of second transmission paths, which is allocated to each color that can be printed by the image output unit and through which the image data is transmitted, and the image data generating apparatus includes:
- an image data generating unit that performs bitmap expansion on a print job received from a host apparatus for each color that can be printed by the image output unit to generate image data; and
- a communication unit that sequentially allocates the image data of colors other than a color which is not used for the superimposed printing to the second transmission path, which is allocated to transmit the image data of the color that is not used for the superimposed printing, and transmits the image data in units of transmission when colors whose number is less by one or more than the number of all colors that can be printed by the image output unit are superimposed and printed.

10. The color printer system according to claim 9, wherein the image data transmitting unit performs:

a first process for selecting the image data of a page that is printed first when the engine performs printing at the highest output among the image data of the color which has not been transmitted, when there is the image data of the color allocated to the second transmission path to be used for transmission; and a second process for selecting data to be transmitted according to priority which is given to the colors in advance from the image data of the page that is printed first when the engine performs printing at the highest output, among the image data which has not been transmitted, when there is no image data of the color allocated to the second transmission path to be used for transmission, and the image data transmitting unit selects image data to be transmitted using the first and second processes.

11. The color printer system according to claim 9, wherein PCI-Express is used for the second transmission path.

12. The color printer system according to claim 10, wherein

PCI-Express is used for the second transmission path.

13. A color printer system comprising:

an engine that superimposes a plurality of colors and performs printing;

an image data generating apparatus that performs bitmap expansion on a print job received from a host apparatus for each color that can be printed by the engine to generate image data;

an engine controller that transmits the image data of each color received from the image data generating apparatus to the engine at an appropriate timing; and transmission paths which are allocated to respective colors that can be printed by the engine and through which the image data is transmitted from the image data generating apparatus to the engine controller, wherein the image data generating apparatus includes an image data transmitting unit that sequentially allocates the image data of colors other than a color which is not used for the superimposed printing to the transmission path, which is allocated to transmit the image data of the color that is not used for the superimposed printing, and transmits the image data in units of transmission, when colors whose number is less by one or more than the number of all colors that can be printed by the engine are superimposed and printed.

14. The color printer system according to claim 13, wherein the image data transmitting unit performs:

a first process for selecting the image data of a page that is printed first when the engine performs printing at the highest output among the image data of the color which has not been transmitted, when there is the image data of the color allocated to the second transmission path to be used for transmission; and a second process for selecting data to be transmitted according to priority which is given to the colors in advance from the image data of the page that is printed first when the engine performs printing at the highest output, among the image data which has not been transmitted, when there is no image data of the color allocated to the second transmission path to be used for transmission, and the image data transmitting unit selects image data to be transmitted using the first and second processes.

15. The color printer system according to claim 13, wherein

PCI-Express is used for the transmission path.

16. The color printer system according to claim 14, wherein

PCI-Express is used for the transmission path.

\* \* \* \* \*